United States Patent Office 3,215,702
Patented Nov. 2, 1965

3,215,702
PHENYLENE BIS(HETEROCYCLIC)THIOETHERS
Walter Reifschneider, Midland, Mich., assignor to The Dow Chemical Company, Midland, Mich., a corporation of Delaware
No Drawing. Filed June 27, 1962, Ser. No. 205,538
4 Claims. (Cl. 260—306.6)

The present invention is directed to thioethers and in particular is directed to novel p-phenylenebis thioethers corresponding to the formula

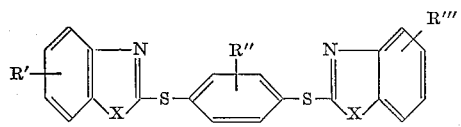

In the present specification and claims, each X independently represents a member of the group consisting of sulfur, oxygen, and —NH— and any substituent R', R" and R''' represents an acyclic lower alkyl group containing from 1 to 4, inclusive, carbon atoms. Thus, the compounds are p-phenylenedithiobisbenzimidazoles, p-phenylenedithiobisbenzothiazoles, and p - phenylenedithiobisbenzoxazoles, ((benzimidazolylthio)phenylthio)benzothiazoles and benzoxazoles, ((benzoxazolylthio)phenylthio)benzimidazoles and benzothiazoles, and ((benzothiazolylthio)phenylthio)benzimidazoles and benzoxazoles and their lower alkyl substituted derivatives.

The novel compounds are colorless crystalline solids appearing white in mass, very slightly soluble in water but readily soluble in various common organic solvents such as lower alkanols, benzene and the like. The compounds are useful as insecticides and as regulators of insect biological functions; as inhibitors of the germination of fungus spores, they are effective fungistats. The compounds are also useful as additives to improve the properties of lubricating oils especially designed for operation under high pressures and temperatures; they are useful as intermediates in the preparation of dyestuffs and biologically active materials; they are also of value as solvent additives in the modification of behavior of mixed solvent systems.

The present compounds are prepared by a process which comprises the steps of causing a reaction between on the one hand, a diahalobenzene compound corresponding to the formula

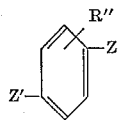

wherein each of Z and Z' represents halogen, the same or different; and R" has the value previously stated, and on the other hand, a mercaptan corresponding to the formula

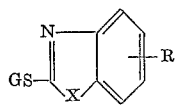

wherein G represents hydrogen, alkali metal, or cuprous copper; R is selected from R' and R''' as hereinbefore described, and X is as hereinbefore defined. During the reaction to prepare the present compounds, two molecules of mercaptan react with each molecule of aromatic halide. Small amounts of mercaptan may be lost in side reactions. Thus, when it is desired to prepare the present compounds in a high state of purity and with a minimum of necessary post-synthesis purification procedure, the mercaptan starting reactant should be employed in an amount twice equimolecular with that of the aromatic halide, or preferably, with the mercaptan in slight excess thereof. However, other proportions may be employed if desired, and unconsumed starting material of whatever identity may, if desired, be removed as impurity or recycled into further synthesis process. When it is desired to prepare symmetrical compounds of the present invention, Z and Z' are alike, and the mercaptan is supplied in amounts about twice that equimolecular with aromatic halide. When preparing unsymmetrical compounds Z and Z' or dissimilar: the halogen of higher molecular weight will react first almost to the exclusion of the other, with a supplied mercaptan, to complete a first reaction step. Thereafter, a second mercaptan is supplied and caused to react, almost exclusively with the halogen, of lower molecular weight, to obtain the desired compounds. The reaction goes forward at temperatures over a wide range, such as from 20° to 350° C., but initiates most readily when heated to a temperature somewhat higher than room temperature; a preferred temperature is from 150° to 300° C. Under these conditions the reaction is, in general, exothermic and goes forward to completion with good yield calculated upon the basis of consumed starting material. When employing mercaptan, hydrogen halide of reaction is evolved and means for its orderly disposal are advantageously provided. Halogen on the dihalobenzene reactant of higher molecular weight usually reacts at temperatures lower than are advantageous when employing halogen of lower molecular weight.

Typically, in the preparation of the compounds of the present invention, reaction between the mercaptan starting material and the aromatic halide starting material will initiate and go forward only when there is employed a catalytic amount of both a source of cuprous ion and a nitrogenous base. Thus, in the preparation of many, and probably all of the present compounds, the employment of such catalyst is essential and critical, although the exact weight is not critical. Certainly the employment of such catalyst is in all cases highly advantageous. The source of cuprous ion may be metallic copper, in which case the copper reacts in some way to obtain cuprous halide. Also, cuprous oxide may be employed as a source of cuprous ion in which case water of reaction is evolved and cuprous halide results. Cuprous chloride itself or other cuprous salt may be employed. The employed amount is not critical, but may vary from a very small trace amount, less than 1/100 of 1 molar percent, to as much as an amount equimolecular with either reactant or even greater. In general, the employment of larger amounts is accompanied by no major advantage and, being expensive, is not preferred.

The nitrogenous base may be ammonia, a primary, secondary, or tertiary aliphatic or aromatic amine or a nitrogenous heterocycle wherein the nitrogen acts, or is capable of acting, as a basic substance. When employing a benzimidazole starting material, it is capable of acting as the necessary nitrogenous base. If desired, the nitrogenous base may be a naturally liquid substance which is employed as a reaction medium. Otherwise, such base is typically dissolved in inert liquid reaction medium such as an aromatic or aliphatic hydrocarbon oil.

It is preferred, at least in laboratory preparations, to employ the nitrogenous base catalyst substance in sufficient excess that portions of it may also act as hydrogen halide acceptor and yet further portions may continue to function, unreacted, in the necessary catalytic manner.

In carrying out the reaction to prepare the symmetrical compounds of the present invention, the aromatic halide and the mercaptan are intimately mixed and blended, in any order and in desired amounts, with source of cuprous ion and nitrogenous base as hereinbefore described, and thereafter heated to a temperature at which reaction takes place promptly. The unsymmetrical compounds are similarly prepared except that the order of addition of reactants should be observed, as noted, to accommodate first the reaction of aromatic substituent halogen of higher molecular weight with first mercaptan reactant. In one convenient method of practicing the present process, the reaction temperature may be the reflux temperature of the liquid reaction mixture. In this situation, heating may be continued at the boiling temperature of the reaction mixture and under reflux for a period of time to carry the reaction to completion.

Upon completion of the reaction, the desired compounds of the present invention are separated in manners which, in view of the teaching of the instant specification, will be evident to skilled chemists. In one such manner, the reaction mixture, hot from heating to the reaction temperature, is poured into a mixture of ice and concentrated hydrochloric acid whereupon a precipitate forms from which the desired product can be extracted as a solvent-soluble fraction. Representative extraction solvents include diethyl ether, chlorinated hydrocarbons and benzene. The said precipitate is extracted with solvent, the solvent extract dried over an inert drying agent such as, for example, anhydrous potassium carbonate or the like; the solvent vaporized and removed and the remaining product chilled or otherwise induced to crystallize and, if desired, recrystallized from a solvent such as a lower alkanol.

When production of the present compounds is to be carried out on an industrial scale, various other methods of separation and purification may be preferred, including, for example, centrifugation, decantation, vacuum distillation and the like.

The following examples, without more, will enable those skilled in the art to practice the present invention.

*Example I.—2,2'-(p-phenylenedithio)bisbenzothiazole*

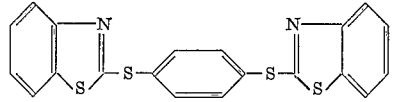

These symmetrical bisbenzothiazole, benzimidazole and benzoxazole compounds of the present invention are all readily prepared in procedures varying in only minor details from the following.

A reaction mixture is prepared consisting essentially of 33.5 grams (0.2 mole) 2-mercaptobenzothiazole, 16 grams technical grade cuprous oxide, and 23.5 grams (approximately 0.1 mole) p-dibromobenzene dispersed in a mixture consisting of approximately 110 milliliters quinoline and 10 milliliters pyridine. The resulting reaction mixture is placed in a flask under reflux, the reflux may be equipped with a water trap. In this situation, the reaction mixture is heated at its reflux temperature (a pot temperature between approximately 200° and 250° C.) for approximately 6 hours to carry the reaction to completion. At the end of this reaction period, the resulting hot mixture is poured into a mixture of shaved ice and an amount of concentrated hydrochloric acid stoichiometric with employed quinoline-pyridine mixture. As a result of these procedures, the ice melts, basic substances react with hydrochloric acid, in the resulting acidified water a precipitate forms. The precipitate is collected by filtration and is extracted with ether, the ether extract liquid being saved. This ether extract liquid is dried over a bed of anhydrous potassium sulfate which also neutralizes remaining traces of acidic substances; the resulting liquid is warmed to vaporize and remove ether solvent and obtain a white crystalline solid 2,2'-(p-phenylenedithio)bisbenzothiazole product in the form of white crystals melting at 195°–198° C.

The compound, tested for its effect when sprayed in water at 500 parts per million upon adult houseflies, was found to inhibit completely the laying of eggs by adult, apparently healthy, females under conditions under which, excepting the present compound, others laid normal egg masses.

The compound of the present example is useful also as an accelerator to be included in a plastic mass of rubber about to be fabricated to hasten the "curing" of the rubber.

*Example II.—2,2'-(p-phenylenedithio)bis(6-methylbenzothiazole)*

In procedures essentially similar to the foregoing except that the starting mercaptan employed in an amount approximately twice equimolecular with the p-dibromobenzene is 2-mercapto-6-methylbenzothiazole, there is prepared in good yield, a 2,2'-(p-phenylenedithio)bis(6-methylbenzothiazole) product, as a white crystalline solid. The product is toxic to insects at rates of application that are safe to be used on plants.

In similar manner, employing 5-tertiarybutyl-2-benzimidazolethiol and 2,5-dibromotoluene, there is obtained a white, crystalline 2,2'-(methyl-p-phenylenedithio)bis(5-tertiarybutylbenzimidazole) product.

Similarly, other compounds symmetrical with respect to the two substituent benzothiazole, benzimidazole, or benzoxazole moieties are prepared.

The compounds of the present invention whereof the condensed heterocyclic moieties are not symmetrically substituted are all conveniently prepared in the following procedures, with the choice of suitable starting materials.

*Example III.—2-(p-(5-tert-butyl-2-benzimidazolylthio)phenylthio)-7-methylbenzothiazole*

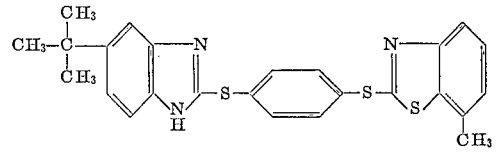

In the preparation of the present compound, the aromatic halide of choice is 1-chloro-4-bromobenzene. Identical product is obtained by using instead 1-bromo-4-iodobenzene. The halobenzene is dissolved in an excess of a nitrogenous, basic, heterocyclic solvent, presently a collidine-lutidine mixture. To this solution is added an equimolecular amount of 6-methylbenzothiazole-7-thiol, with heating and stirring for a period of several hours, until a small sample, tested by infrared spectrum analysis, is found to contain only traces of dihalogen-substituted or brominated aromatic substance. This first thiol compound reacts with the brominated site of the bromochlorobenzene to prepare an intermediate material.

Thereupon an amount of 5-t-butyl-1,3-benzimidazolethiol equimolecular with the starting halobenzene is added to the mixture, with continued heating and stirring, and allowed to react until the resulting mixture is found to be essentially free of halobenzene, when tested by infrared spectrum.

The resulting reaction mixture is thereupon worked up, that is to say, desired product is separated and purified, in the manner of Example I. The hot reaction mixture is quenched over ice and hydrochloric acid, the resulting precipitate collected by filtration and extracted with ether. From the liquid extract, the desired product is obtained by vaporizing ether solvent to remove it, and reprecipitating the resulting product from isopropanol to obtain a glass-like 2-(p-(5-tertiary-butyl-2-benzimidazolylthio)phenylthio)-7-methylbenzothiazole product, of the formula

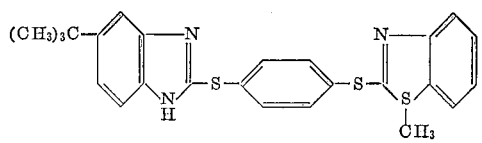

In procedures essentially the same as the foregoing, by the use of appropriate starting materials, other products of the present invention are prepared as follows:

From 1-bromo-4-chlorobenzene and successively, equimolecular proportions of 2-benzoxazolethiol and 2-benzothiazolethiol, in the presence of cuprous oxide and in liquid lutidine-quinoline mixture, an intermediate 2-p-chlorophenylthiobenzoxazole and a final 2-(p-(2-benzothiazolylthio)phenylthio)benzoxazole.

From p-diiodobenzene and 7-isopropyl-2-benzimidazolethiol, in the presence of cuprous lactate and in a propanol solution of secondary n-butylamine, a 2,2'-(p-phenylenedithio)bis(7-isopropyl-2-benzimidazole product.

From p-dichlorobenzene and an excess above 2 molecular proportions of 7-methylbenzothiazolethiol in the presence of cuprous phosphate and in liquid N,N-dipentylxylidine, 2,2'-(p-phenylenedithio)bis(7-methylbenzothiazole).

From 1-choloro-4-iodo-3-n-propylbenzene and 5-tert,-butyl-2-benzimidazolethiol in the presence of ammoniacal cuprous sulfate and aniline, 2,2'-(1,4-(5-tert.-butyl)phenylenedithio)bisbenzimidazole.

From 1,4-difluoro-3-methylbenzene and 2-benzoxazolethiol in a liquid lutidine-quinoline mixture in the presence of cuprous bromide, 2,2'-(1,4-di-(3-methylphenyl)thio)-bisbenzoxazole.

From p-dibromobenzene and 2-benzimidazolethiol, a 2,2'-(p-phenylenedithio)bisbenzimidazole product.

From p-diiodobenzene and 2-benzoxadolethiol, a 2,2'-(p-phenylenedithio)bisbenzoxazole product.

Mercaptobenzothiazole is an article of commerce; it is prepared in good yield from the reaction caused by heating together aniline, sulfur, and carbon disulfide. By the use of an appropriate alkyl substituted aniline, the substituted compounds are prepared.

Benzoxazolethiol is readily prepared by heating 2-aminophenol and carbon disulfide in an atmosphere of hydrogen, as reported by Dunner in Berichte der deutschen chemischen Gesellschaft, volume 9, page 465. The use of the appropriate alkyl-substituted aminophenol yields the corresponding substituted product.

Benzimidazolethiol and its ring-alkyl-substituted derivatives are readily prepared in the manner of Hellmann. See Liebig's Annallen der Chemie, volume 221, page 9. By the use of suitable alkyl-substituted o-phenylenediamine hydrochlorides, it is possible to prepare the various substituted benzimidazolethiols of use in the present invention.

When suitable apparatus is available, the products of the present invention are readily separated from the reaction mixtures in which they are prepared by steam- (that is to say water-azeotropic) distillation, in which case a relatively pure product separates as an immiscible organic phase in the two-phase distillate.

I claim:
1. A compound corresponding to the formula

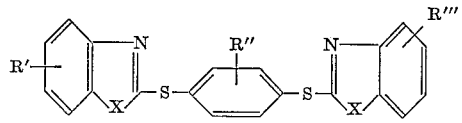

wherein X represents a member of the group consisting of sulfur, oxygen , and —NH—, and each of R', R" and R''' represents a member of the group consisting of hydrogen and an acyclic alkyl group containing from 1 to 4, inclusive, carbon atoms.

2. 2,2'-(p-phenylenedithio)bisbenzothiazole.
3. 2,2' - (p - phenylenedithio)bis(6 - methylbenzothiazole).
4. 2-(p - (5 - tert.-butyl-2 - benzimidazolythio)phenylthio)-7-methylbenzothiazole.

No references cited.

IRVING MARCUS, *Primary Examiner.*
WALTER A. MODANCE, *Examiner.*